(12) United States Patent
Riggins et al.

(10) Patent No.: US 8,516,440 B1
(45) Date of Patent: Aug. 20, 2013

(54) SYSTEMS AND METHODS FOR USING A TIMELINE TO DEVELOP OBJECTS AND ACTIONS IN MEDIA CONTENT

(75) Inventors: Randy Karl Riggins, Oakland, CA (US); Thomas E. Bednarz, Jr., Natick, MA (US); Emilio Passi, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1181 days.

(21) Appl. No.: 12/257,647

(22) Filed: Oct. 24, 2008

Related U.S. Application Data

(60) Provisional application No. 61/123,861, filed on Apr. 11, 2008.

(51) Int. Cl.
*G06F 9/44* (2006.01)

(52) U.S. Cl.
USPC ........... 717/110; 717/105; 717/108; 717/111; 717/113

(58) Field of Classification Search
None
See application file for complete search history.

(56) References Cited

U.S. PATENT DOCUMENTS

| | | | |
|---|---|---|---|
| 5,642,511 A | 6/1997 | Chow et al. | |
| 5,742,848 A | 4/1998 | Burgess | |
| 5,862,379 A | 1/1999 | Rubin et al. | |
| 5,870,088 A | 2/1999 | Washington et al. | |
| 6,035,303 A | 3/2000 | Baer et al. | |
| 6,178,432 B1 | 1/2001 | Cook et al. | |
| 6,425,120 B1 | 7/2002 | Morganelli et al. | |
| 6,425,121 B1 | 7/2002 | Phillips | |
| 6,564,368 B1 | 5/2003 | Beckett et al. | |
| 6,823,495 B1 | 11/2004 | Vedula et al. | |
| 7,155,676 B2 * | 12/2006 | Land et al. | 715/731 |
| 7,159,185 B1 | 1/2007 | Vedula et al. | |
| 7,240,328 B2 | 7/2007 | Beckett et al. | |
| 7,340,721 B1 | 3/2008 | Bailey | |
| 7,730,410 B2 | 6/2010 | Goering | |

OTHER PUBLICATIONS

Microsoft Corp, *Microsoft Office Access Non-Patent Literature Screenshots*, pp. 1-13.

\* cited by examiner

*Primary Examiner* — Chuck Kendall
(74) *Attorney, Agent, or Firm* — Kilpatrick Townsend & Stockton LLP

(57) ABSTRACT

Certain embodiments provide an intuitive interactive media content development environment that simplifies the creation of actions. For example, it may allow users to easily specify that a shape will move when the media content is first executed or that a web page will be opened when a button is clicked within the media. Certain embodiments provide a timeline interface showing the sequence and duration of one or more such actions. For example, a timeline component may allow a user to change the delay or duration associated with an action by manipulating the timeline. A timeline may comprise one or more visual components representing actions and action attributes and allow a user to adjust action attributes by manipulating the visual components.

22 Claims, 13 Drawing Sheets

SYSTEMS AND METHODS FOR USING A TIMELINE TO DEVELOP OBJECTS AND ACTIONS IN MEDIA CONTENT

CLAIM OF PRIORITY

This application claims priority to U.S. Provisional Patent Application No. 61/123,861, filed Apr. 11, 2008, entitled "SYSTEMS AND METHODS FOR DEVELOPING OBJECTS AND ACTIONS IN MEDIA CONTENT AND FOR CREATING AND STORING OBJECT AND ACTION DATA DURING MEDIA CONTENT DEVELOPMENT," and which is hereby incorporated herein by this reference.

FIELD

Embodiments of the present disclosure relate generally to the development of media content, including moving and interactive media content.

BACKGROUND

Various software applications and other tools facilitate the creation of media content such as web banners, site openers, showcase sites, and concept pitches. An "action" is something that happens when content runs, including what a page or object within a page does. An action can describe motion (move, face, etc.) or interaction (play, go to link, etc.). Media content can involve various types of objects, including displayed objects such as squares, circles, other shapes, buttons, text, web links, images, movies, and objects that are not displayed.

Some media content development tools display a development canvas that provides a visual preview of the content being developed and allows adjustment of the size or position of a displayed object. However, generally, such tools require significant user effort, particularly in defining movement, interactivity and other actions, which are typically user coded. While such tools are often powerful, robust, and useful, they may be ill-suited for some users, such as those unfamiliar with the particulars of the development environment, coding syntax, and parameters, including the available objects, actions, and triggers. For example, timeline features in existing tools tend to provide frame-based features that are both granular and powerful but that generally fail to provide mechanisms for observing and controlling actions as whole units and instead tend to present and control content as granular changes to properties over time.

SUMMARY

Certain embodiments of the present disclosure provide an intuitive interactive content development environment that provides a timeline interface to display and receive changes for actions and objects. In one embodiment, a user interface is provided for developing content that specifies an action that will be triggered by a triggering event during runtime of the content. The action may have a delay, duration, and other attributes associated with it. A delay time associated with the action defines an amount of time from the triggering event to a start of the action. A duration comprises an amount of time from the start of the action to an end of the action. The method further comprises displaying a timeline comprising a graphical representation of the action as a single object. This timeline may represent a time period having an endpoint at the triggering event and comprise one or more indications of time increments occurring after the triggering event. The graphical representation of the action may comprise a feature representing the start of the action, a feature representing the end of the action, a feature representing the duration of the action, and feature representing delay of the action. The method may further comprise receiving a change to the graphical representation of the action on the timeline and changing the action based on the change to the graphical representation of the action. As examples, the change may change the start or end of the action, the delay of the action, or the duration of the action, among other things.

In certain embodiments, a displayed object is associated with the triggering event. An exemplary method may involve receiving a selection of an object to trigger the triggering event, the object displayed on a canvas displayed on the user interface. For example, if the triggering object is a button, the triggering event may be a click of the button, and the action may be a movement of a shape on the canvas. However, a triggering event need not be associated with an object. For example, a triggering event may be the opening/execution of the content, e.g., triggering actions to occur based on the opening of the content within a media content player can trigger one or more actions.

Certain embodiments provide an event-based timeline, e.g., a timeline showing and allowing changes to all actions associated with a particular triggering event. Such a timeline may comprise indications of the time increments from the occurrence of the triggering event and a graphical representation of each of a plurality of actions triggered by that same event. A timeline-based preview component may provide a convenient mechanism for a user to preview only those actions shown in a displayed timeline, which in some embodiments, include only actions associated with a single object, or only actions associated with a single action, among other useful groupings of actions that may be displayed on a timeline.

In other embodiments, a computer-readable medium (such as, for example, random access memory or a computer disk) comprises code for carrying out these methods.

These embodiments are mentioned not to limit or define the disclosure, but to provide examples of embodiments to aid understanding thereof. Embodiments are discussed in the Detailed Description, and further description is provided there. Advantages offered by the various embodiments may be further understood by examining this specification.

BRIEF DESCRIPTION OF THE FIGURES

These and other features, aspects, and advantages of the present disclosure are better understood when the following Detailed Description is read with reference to the accompanying drawings, wherein.

DETAILED DESCRIPTION

Figure 1:
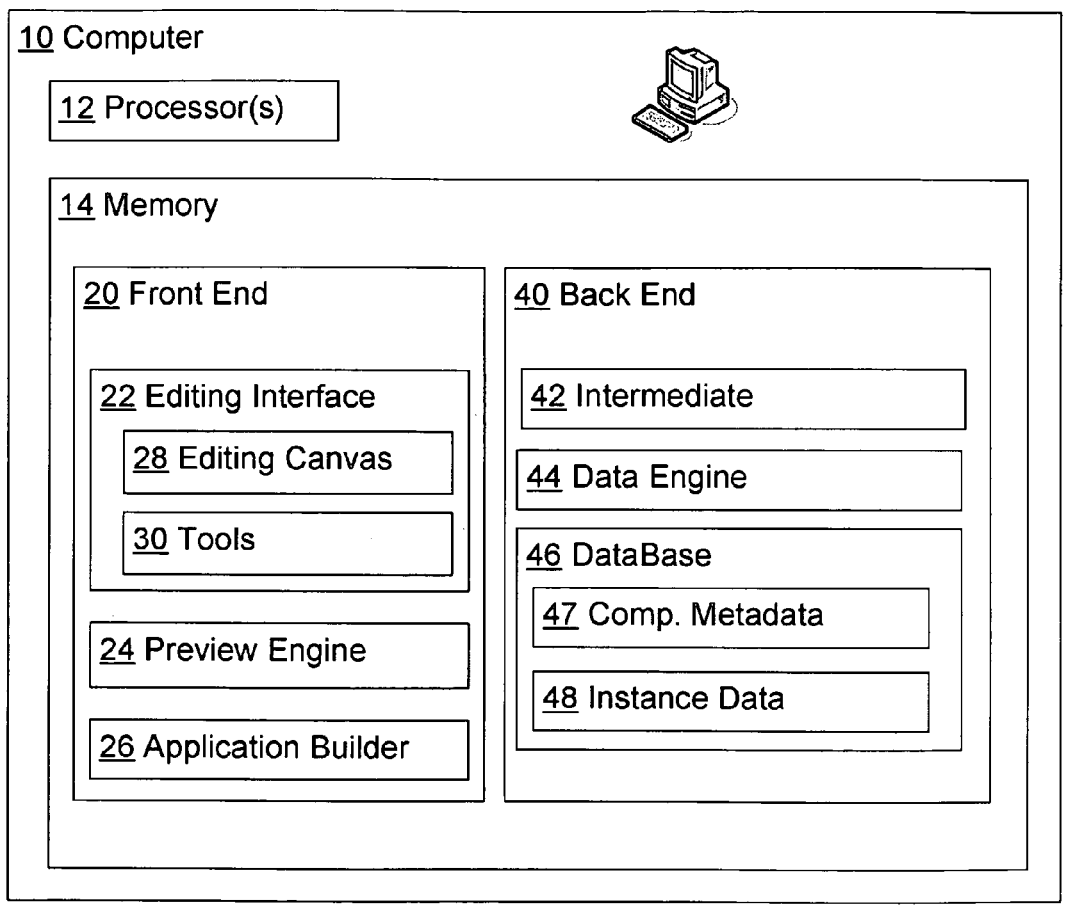
FIG. 1 is a system diagram illustrating an exemplary application environment according to certain embodiments.
Figure 1:
Figure 1:

Certain embodiments of the present disclosure provide an intuitive interactive media content development environment that simplifies the creation of actions, for example, allowing users to easily specify that a shape will move when the media is run or that a web page will be opened when a button is clicked within the media. The assignment of an action may involve one or more displayed objects, including, as examples, trigger objects associated with an event that triggers the action and target objects that move or otherwise perform the specified action(s). Embodiments provide a visual and intuitive interface that minimizes the experience required of a user and, in some cases, provide a primarily mouse-click driven development environment for both objects and actions, including for specifying interactions between objects.

Certain embodiments provide a timeline showing the sequence and duration of one or more actions. A timeline may be interactive. For example, a timeline may allow a user to change the delay or duration associated with an action by manipulating the timeline. Accordingly, a timeline may comprise one or more visual components representing actions and action attributes and allow a user to adjust action attributes by manipulating the visual components. An entire action, e.g., a spin, may be represented as a single, editable visual component. For example, a slide action may be represented as a bar on a timeline with the width of the bar representing the length of the duration of the action and the edges of the bar representing the start and stop times (e.g., relative to the triggering event). By manipulating the width and edges of that bar, a user can adjust the delay (e.g., changing the start time from 0 seconds after a triggering event to 2 seconds after the event) and duration (so that an object slides for 3 seconds rather than 2 seconds), among other things.

A timeline may provide event-based action information. For any event, e.g., a mouse click, a mouse over, an application startup, etc., the timeline may display all of the triggered actions. A timeline may show how the timing of such actions relate to one another. For example, a user may add two actions to a square, one to make it spin and another to make it slide. Both actions are triggered by clicking the square. A timeline can display representations of each of these actions and allow the user to adjust delay, duration, and other features. For example, a user may be able to delay the start of a sliding action by two seconds. As another example, a user may extend the time over which a square slide action occurs, i.e., increasing the time it takes for the square to move from a start position to an end position. Actions displayed on an event-based timeline may relate to different objects triggered by a same event. For example, clicking a button may trigger a square object to slide and a circle object to enlarge. Thus, in certain embodiments a timeline provides a view of the global actions that occur within in interactive application upon the occurrence of a given triggering event.

Certain embodiments provide a user interface that allows a user to select an object and see a list of the events that are defined to be triggered through the object, e.g., the user can select the button A object and see a list including a mouse click event, a mouse over event, etc. The user may then select a triggering event to access an actions timeline showing representations of the actions triggered by the selected triggering event.

A timeline can include representations of different types of actions including, but not limited to transforms (e.g., slide), effects (e.g., glow), and behaviors (e.g., go to web link). In certain embodiments, a timeline is provided for visualizing and controlling these and other actions.

Illustrative Application Environment

FIG. 1 is a system diagram illustrating an application environment according to certain embodiments. Other embodiments may be utilized. The environment 1 shown in FIG. 1 comprises a computing device 10 that comprises a processor 12 and memory 14. In certain embodiments, a media content development application comprises a front end 20 and a back end 40. The front end 20 comprises an editing interface 22, a preview engine 24, and an application builder 26. The editing interface 22 may be used to display an editing canvas 28 to allow a user to create media content, including interactivity. The editing interface may also comprise various tools 30 that a user may use to develop interactive content on the editing interface 22. The preview engine 24 may be used to mimic the runtime behavior of a media content application being developed on the editing interface 22. The application builder 26 may be used to publish or otherwise generate a final piece of media based on the information specified on the editing interface 22.

The back end 40 may supports the operation of the front end 20 components. The back end 40 may comprise an intermediate component 42 that interfaces between a component archive module (not shown) and the data engine 44. The data engine 44 may store data in a database 46, such as a relational database. Such information may include component metadata 47, including information about object and action types and associated default values. The component metadata 47 may be extracted from a component archive module (not shown) by the intermediate 42 and provided to the data engine 44 for storage in the database 46. The component metadata 47 stored in the database 46 may be used by the front end 20, which will generally access such data 47 through the data engine 44. For example, the editing interface 22 may ask the database engine 44 for a list of actions that are available for a particular object type. The database 46 may also be used to store instance data 48 reflecting information about objects and actions instances created on the editing canvas. For example, when a button is moved on the editing canvas 28 of the editing interface 22, information about the position of the button may be stored in the database 48.

The editing interface 22 and preview engine 24 may operate using some or all of the technologies used by the runtime component. For example, if the development tools facilitate development of an application that can be run on an Adobe® Flash Player®, the editing interface 22 and preview engine can include actual Adobe® Flash® technologies to facilitate the display and preview of objects and actions. Accordingly, a virtual machine can be used that effectively runs an Adobe® Flash Player®.

Illustrative Methods of Presenting a User with a Timeline

Certain embodiments of the present disclosure provide a user interface that allows a user to specify one or more actions for an object that describe what the object does when the interactive content runs. The interface further provides the user with a timeline showing the sequence and duration of one or more actions. In one embodiment, the timeline is interactive. For example, a user can change the delay or duration associated with an action. The following specific illustrative embodiment is provided to illustrate some of the applications, uses, and benefits of providing various exemplary media development tool timeline features.

Figure 2A:
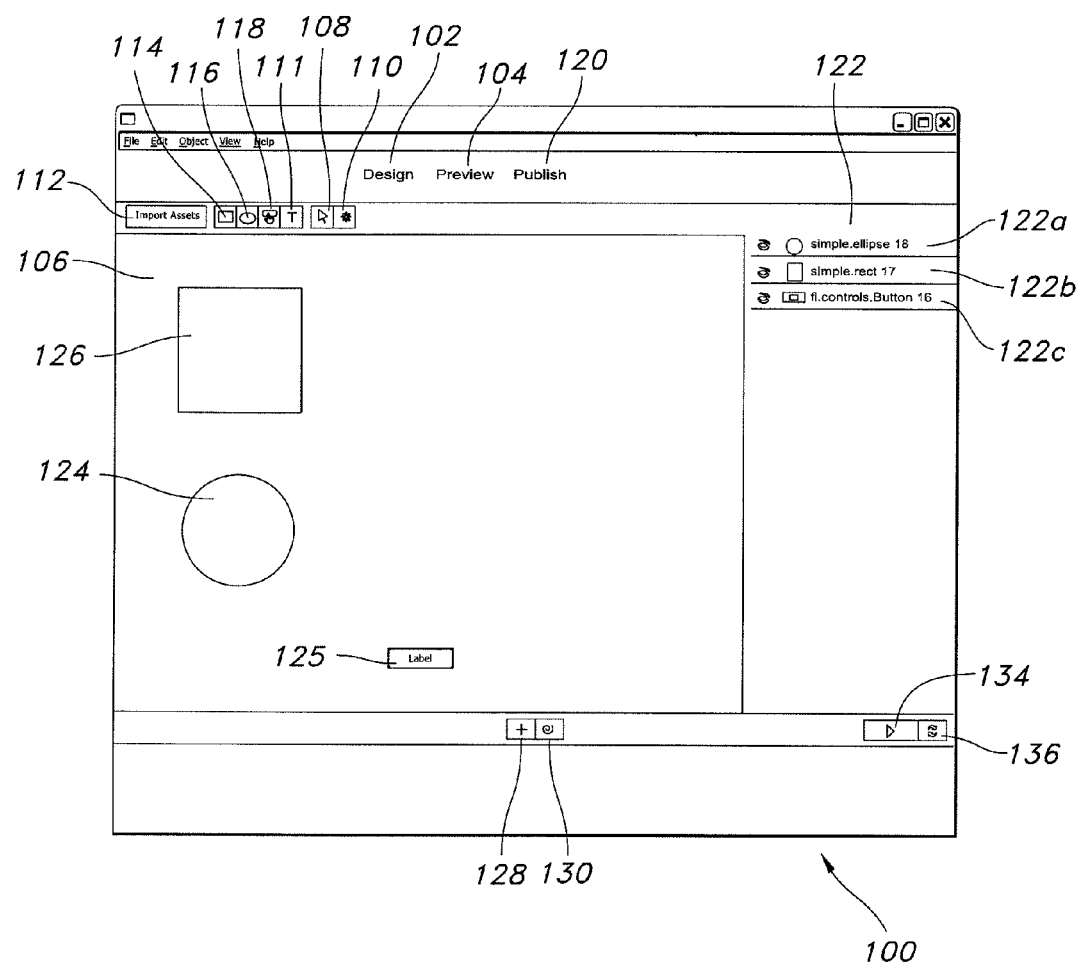
FIGS. 2a-i are illustrations of an exemplary user interface according to certain embodiments.

FIGS. 2a-i are illustrations of a user interface 100 according to certain embodiments. As shown in FIG. 2a, the user interface comprises two modes: a design mode selectable with the DESIGN button 102 and a preview mode selectable with the PREVIEW button 104. While in design mode, the user interface comprises a stage or canvas area 106, upon which a user can visually position and manipulate objects and specify actions.

This exemplary user interface 100 further comprises a variety of tools, including a selection tool 108 for selecting objects displayed and actions represented on the canvas area 106, an action tool 110 for specifying actions, a text tool 111 for specifying text, an import tool 112 for importing graphics, video, and other ingredients, a rectangle tool 114 for drawing a rectangle object, an ellipse tool 116 for drawing an ellipse object, and a button tool 118 for drawing a button object. Other tools may of course be provided.

The user interface 100 shown in FIG. 2a further comprises a publish button 120, which allows a user to publish a created document, for example, by creating an executable or otherwise usable file or collection of files that can be distributed or made available to an audience. The user interface 100 also displays a layers area 122 for providing information about the components placed on the canvas area 106. The user interface 100 may further display other controls, such as a control 128 that allows a user to click to add an action to a selected object and a control 130 that allows a user to click and drag to choose an object and add an action to it. Various other features 134, 136 may be used to preview actions for a specific timeline. Other embodiments may involve differing and/or additional tools for the creation and use of objects and actions.

The following example illustrates how a user is able to simply and easily create and control actions using the user interface 100, including a timeline feature of the user interface 100. On the user interface 100, a user uses the rectangle tool 114 to create a rectangle 126, the circle tool 116 to create a circle 124, and the button tool 118 to create a button 125 on the canvas area 106. The user may have positioned these objects and adjusted various attributes associated with the objects' locations and appearances.

Figure 2B:
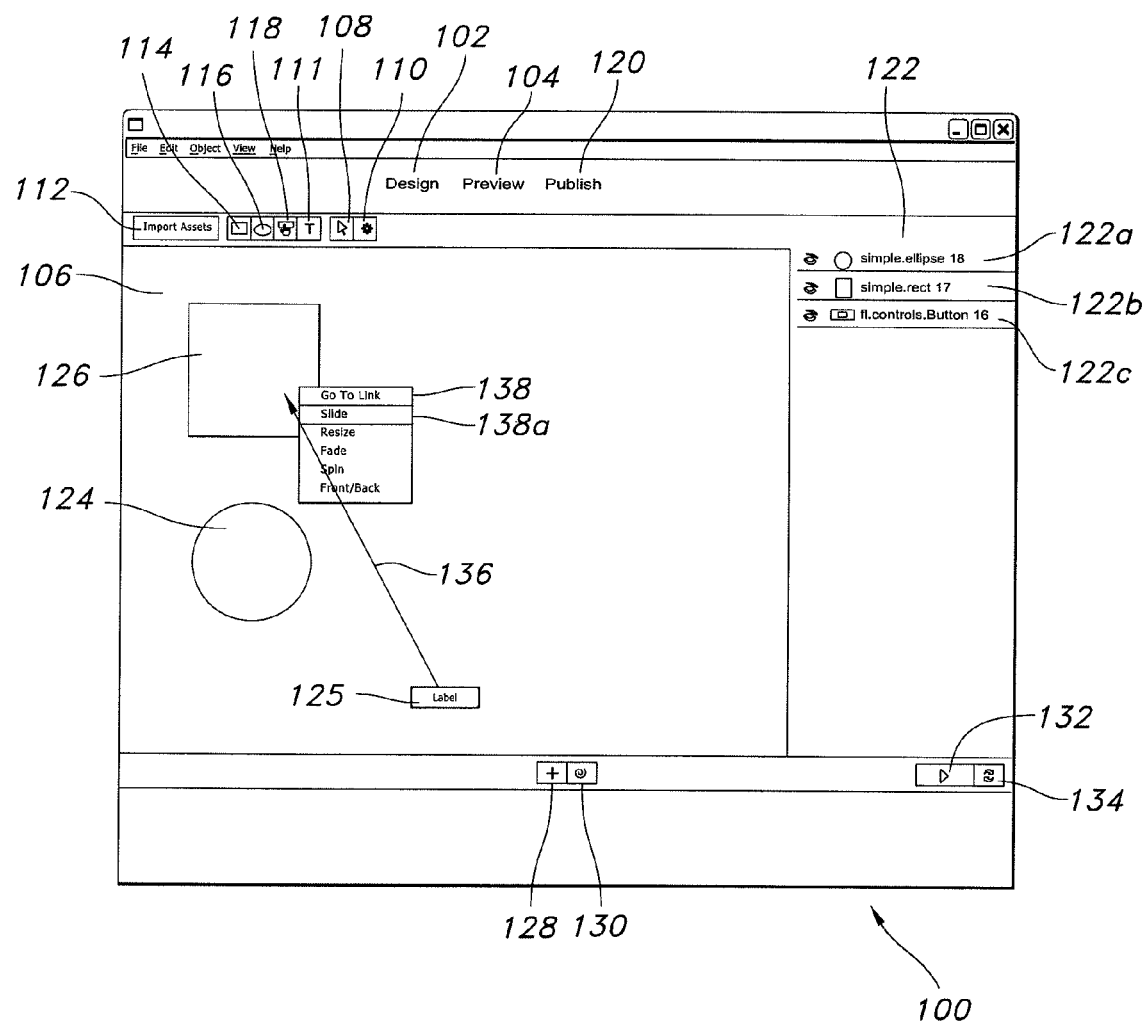

After introducing these objects 124, 125, 126, the user performs several tasks to define actions that will be triggered by a "click" event of the button 125. As shown in FIG. 2b, the user selects the action tool 110, mouse clicks on the button 125 and drags an arrow to the rectangle 126 to create a rectangle 126 action triggered by a button 125 event, in this case the "click" event. The user selects the slide action 138a from the action menu 138 (e.g., with options including Go To Link, Slide, Resize, Fade, Spin, and Front/Back, as examples) to specify that the rectangle action will be a slide action.

Figure 2C:
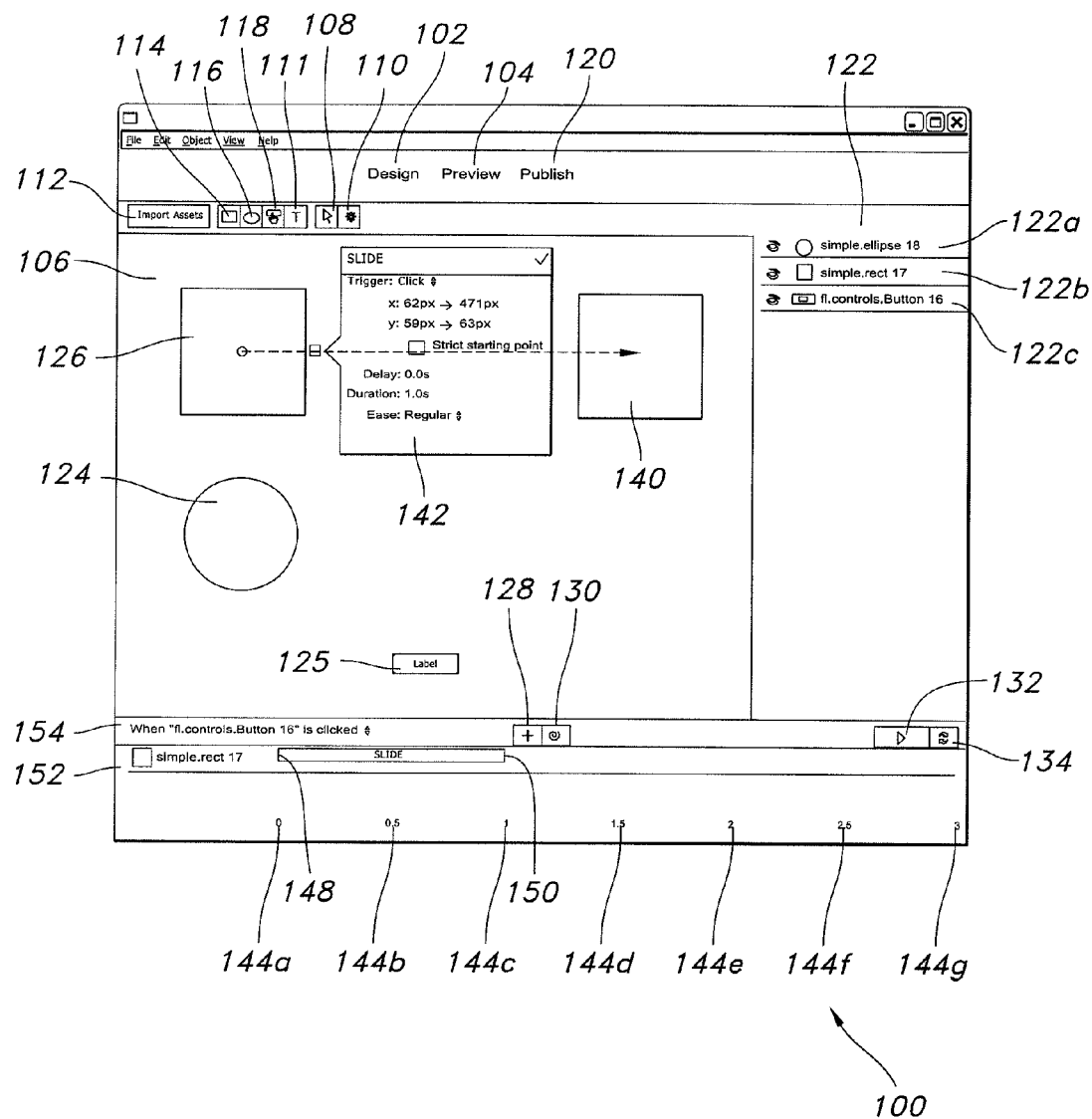

As shown in FIG. 2c, the user specifies a resulting position 140, e.g., the final position of the rectangle 126 at the conclusion of the slide action. The action properties interface 142 allows the user to specify or change attributes of the slide action, e.g., the trigger event, the starting and ending coordinates, whether the action involves a strict starting point, the action delay, the action duration, and the ease, as examples. In addition, the user interface includes a timeline interface 154 associated with the button click. This timeline interface 154 comprises a timeline 144a-g (e.g., showing time increments on a scale). The timeline interface 154 also includes an slide action representation 146 next to an identifier 152 that identifies the rectangle 126 as the object associated with the slide action representation 146. The slide action representation 146 is illustrated as a bar having a beginning 148 and an end 150, each associated by their relative location with timeline 144. For example, the beginning 148 of the slide action is at the "0" time increment on the timeline 144 indicating that there is "0" seconds of delay between the click of the button 125 and the start of the slide action. The end 150 is at the 1 second time increment 144c of the timeline 144 indicating that the rectangle will reach its final position 140 one second after the button 125 is clicked, i.e., one second after the button 125 click event occurs. The length of the slide action representation 146 graphically represents the duration of the slide action, which, in this example, is one second.

Figure 2D:
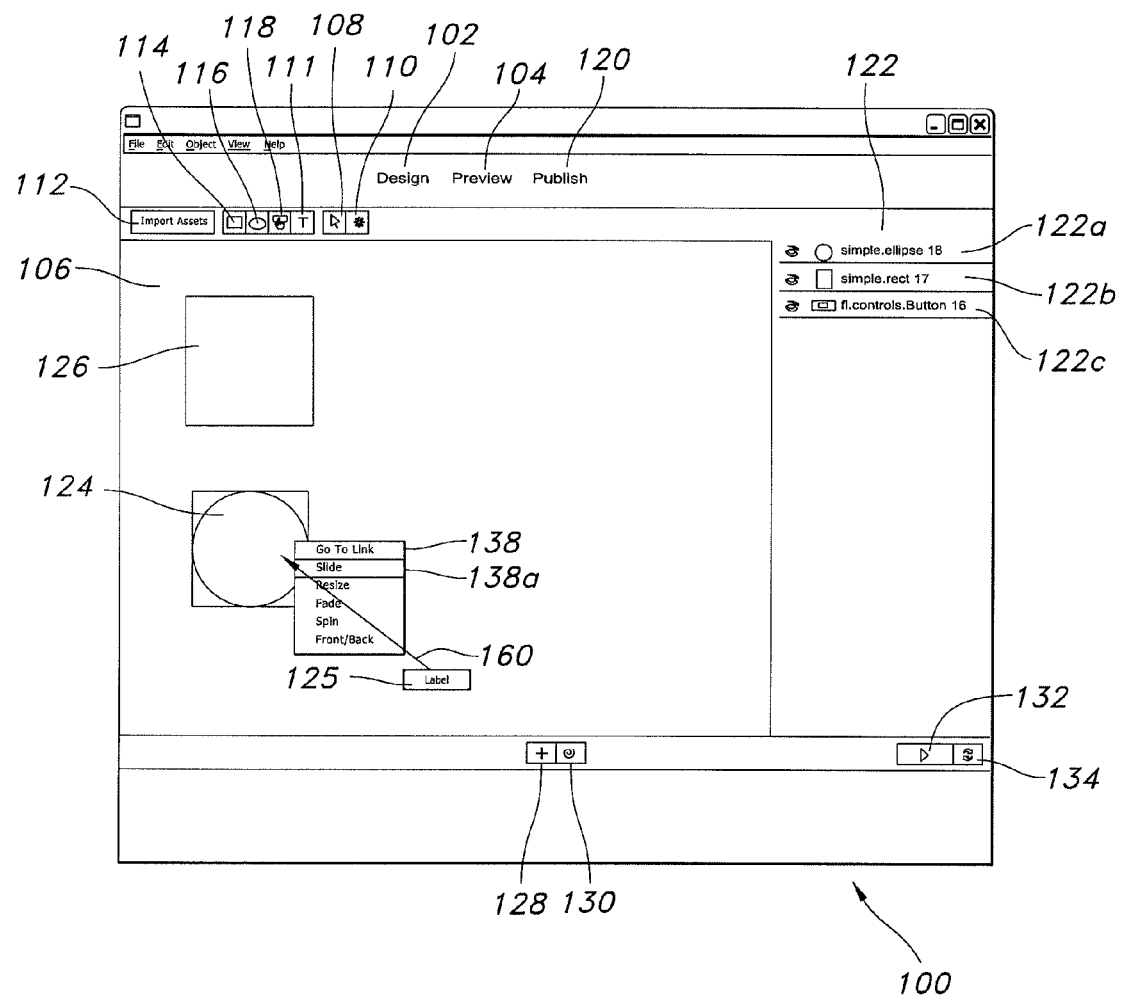
Figure 2E:
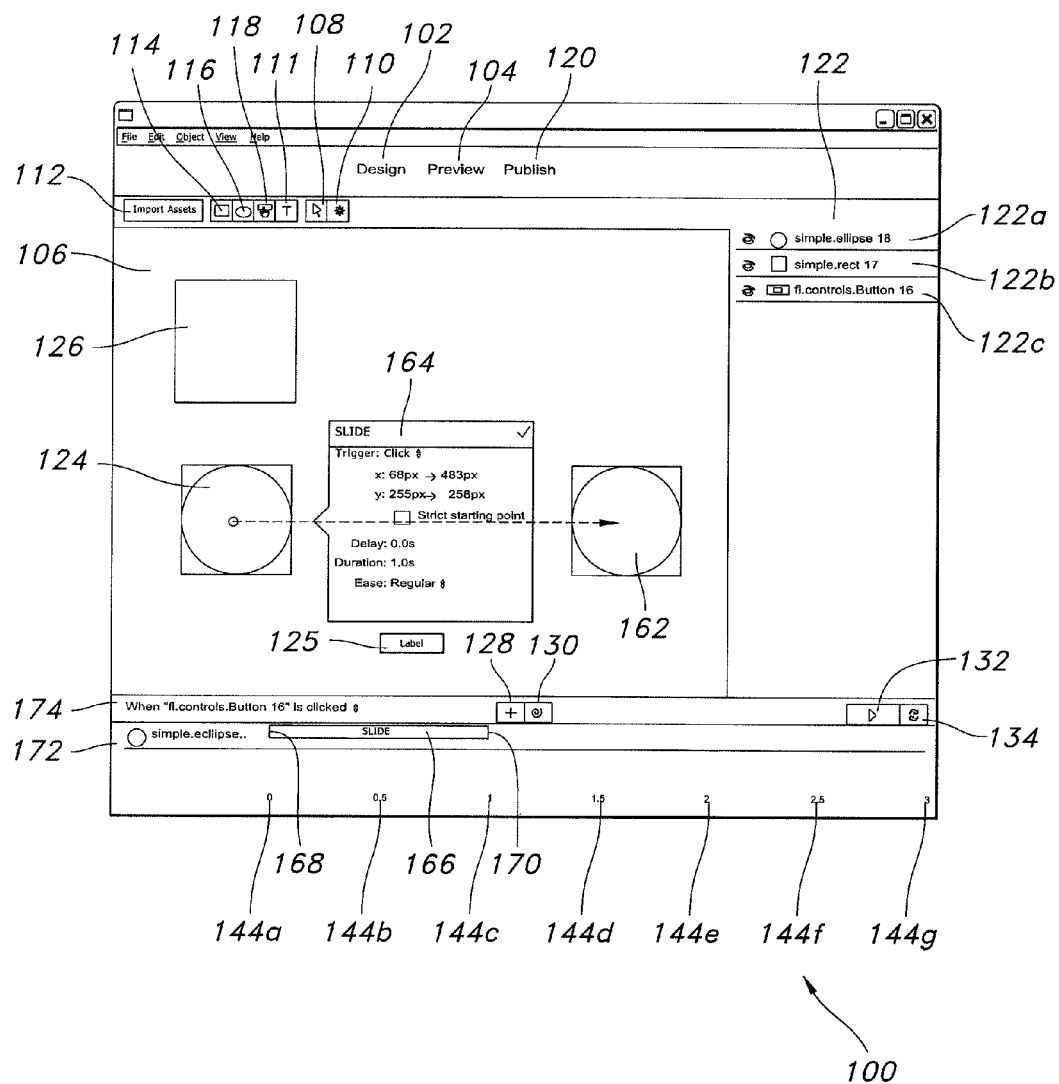

In a similar manner, as shown in FIG. 2d, the user creates a slide action for the circle 124. The user selects the action tool 110, clicks on the button 125 and drags an arrow to the circle 124 to create a circle 126 action triggered by a button 125 event. The user selects the slide action 138a from the action menu 138 to specify that the circle action will be a slide action. As shown in FIG. 2e, the user specifies a resulting position 152, e.g., the final position of the circle 124 at the conclusion of the slide action. The action properties interface 164 allows the user to specify or change attributes of the slide action, e.g., the trigger event, the starting and ending coordinates, whether the action involves a strict starting point, the action delay, the action duration, and the ease, as examples. Again, the user interface includes a timeline interface 174 associated with the button click. This timeline interface 174 comprises the timeline 144a-g and a slide action representation 166 next to an identifier 172 that identifies the circle 124 as the object associated with the slide action representation 166. The slide action representation 166 is illustrated as a bar having a beginning 168 and an end 170, each associated by their relative location with timeline 144. For example, the beginning 168 of the slide action is at the "0" time increment and the end 150 is at the 1 second time increment 144c of the timeline 144.

Figure 2F:
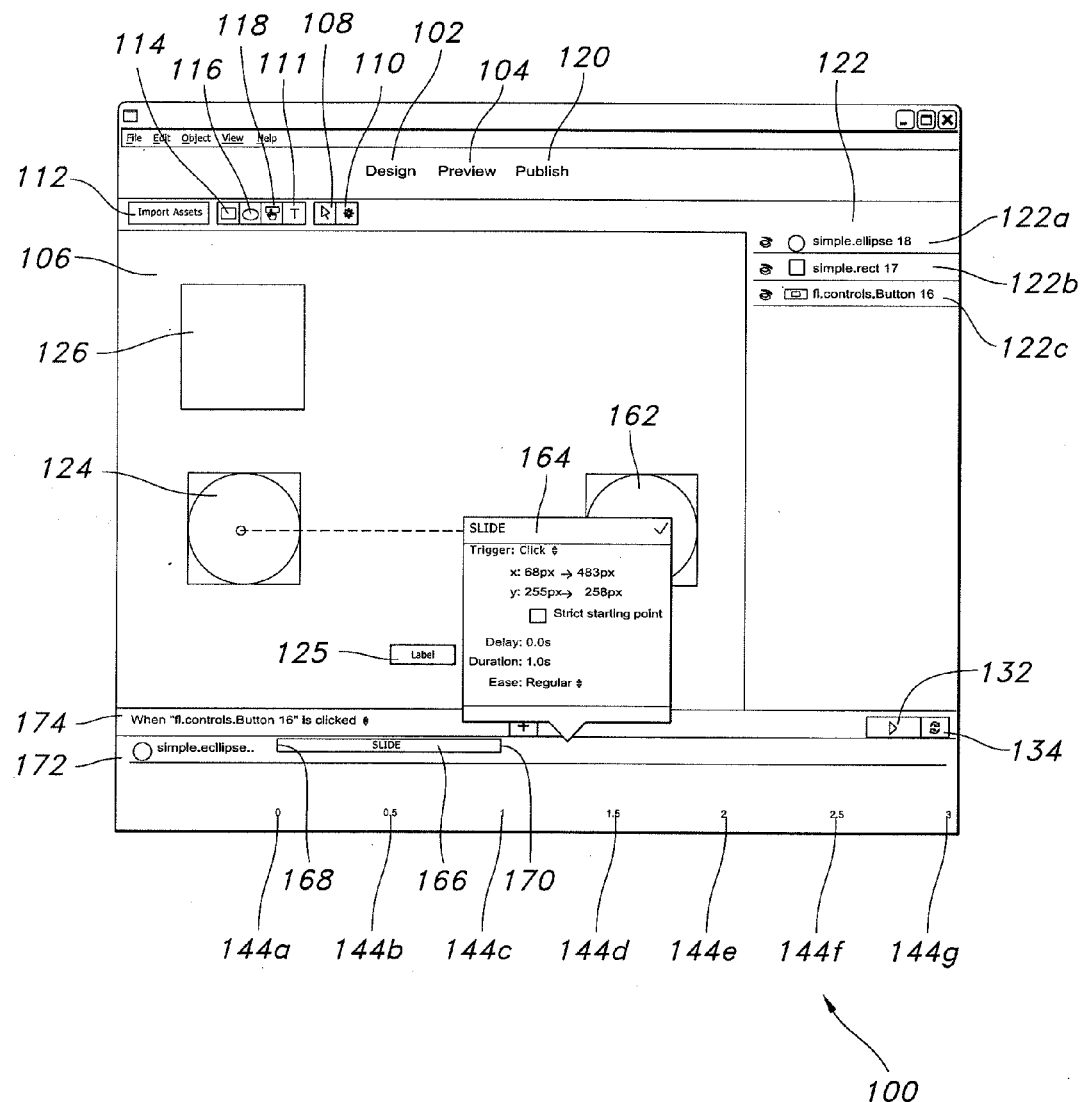

As shown in FIG. 2f, the user next uses the timeline interface 174 to change the slide action associated with the button's click event. Specifically, the user clicks on the representation 166 of the slide action and drags the representation 166 to a new location relative to the timeline 144. As shown, the beginning 168 of the slide action now appears just after 0.5 seconds on the timeline 144 and the end 170 now appears just after 1.5 seconds on the timeline. Accordingly, the user has, in a very simple manner, been able to change the delay associated with the action, e.g., upon a button click event there will be a delay of 0.6 seconds before the circle 24 begins the slide activity. The timeline interface 174 has provided both a visual representation of the slide action and a convenient means of modifying timing attributes of the slide action. As the user manipulates action representations on a timeline interface, an additional action properties interface 164 may be presented to allow a user to view and specify the same and other attributes of the action, e.g., the user could specify a numeric value for the delay using this action properties interface 164.

Figure 2G:
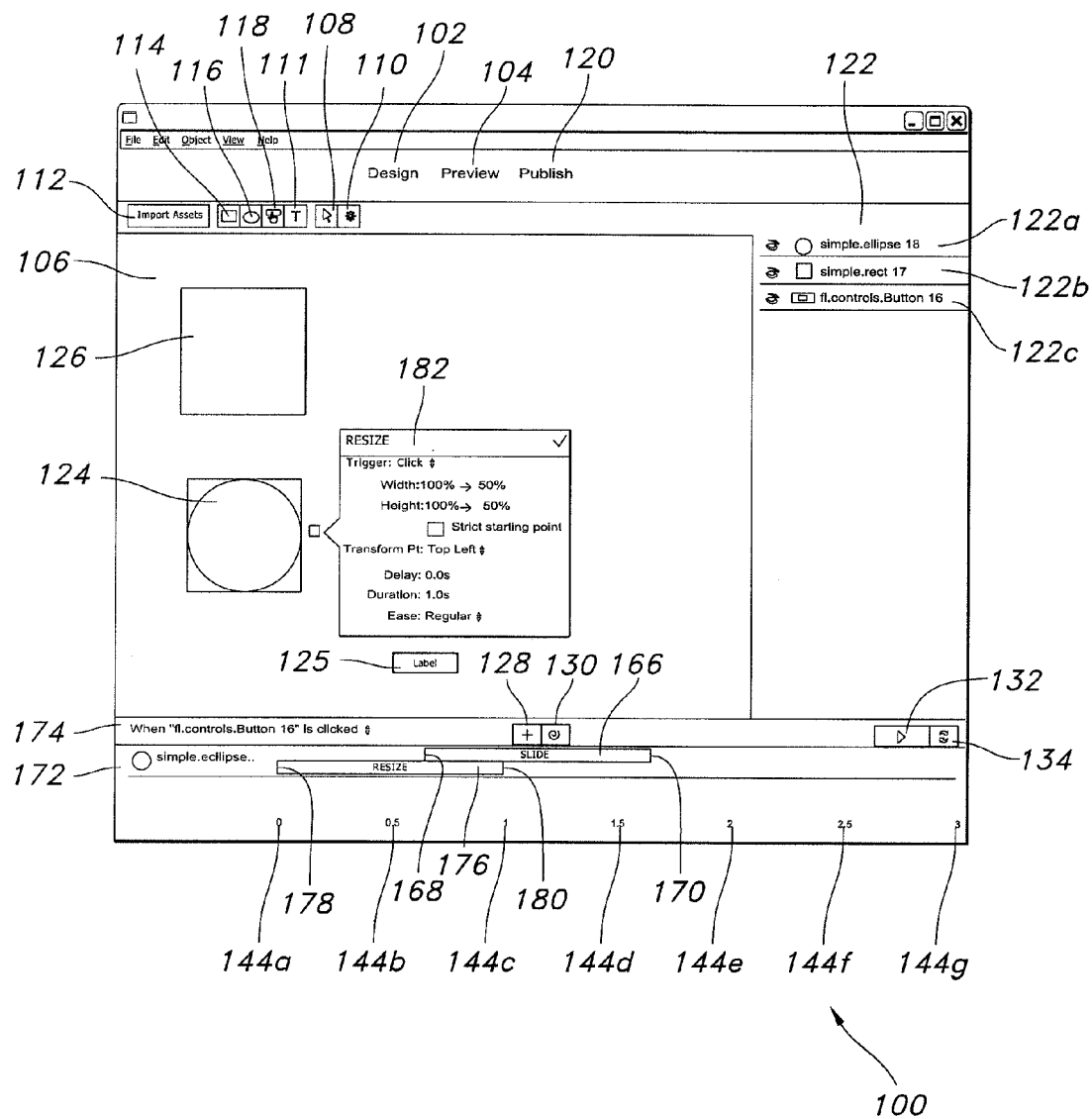

Just as the user specified the slide action for the circle 124, the user can specify another action for the circle 124 that is also triggered by the button's click event. As shown in FIG. 2g, the user specifies a resize action triggered by a button click for example using the action tool 110 to create the action and then specifying details on a resize action properties interface 182. As a result of creating the new action, the timeline interface 174 changes to reflect a representation 176 of the resize action, while continuing to show the representation 166 of the slide action. The representation 176 of the resize action also has a beginning 178 and an end 180 on the timeline interface 174.

Figure 2H:
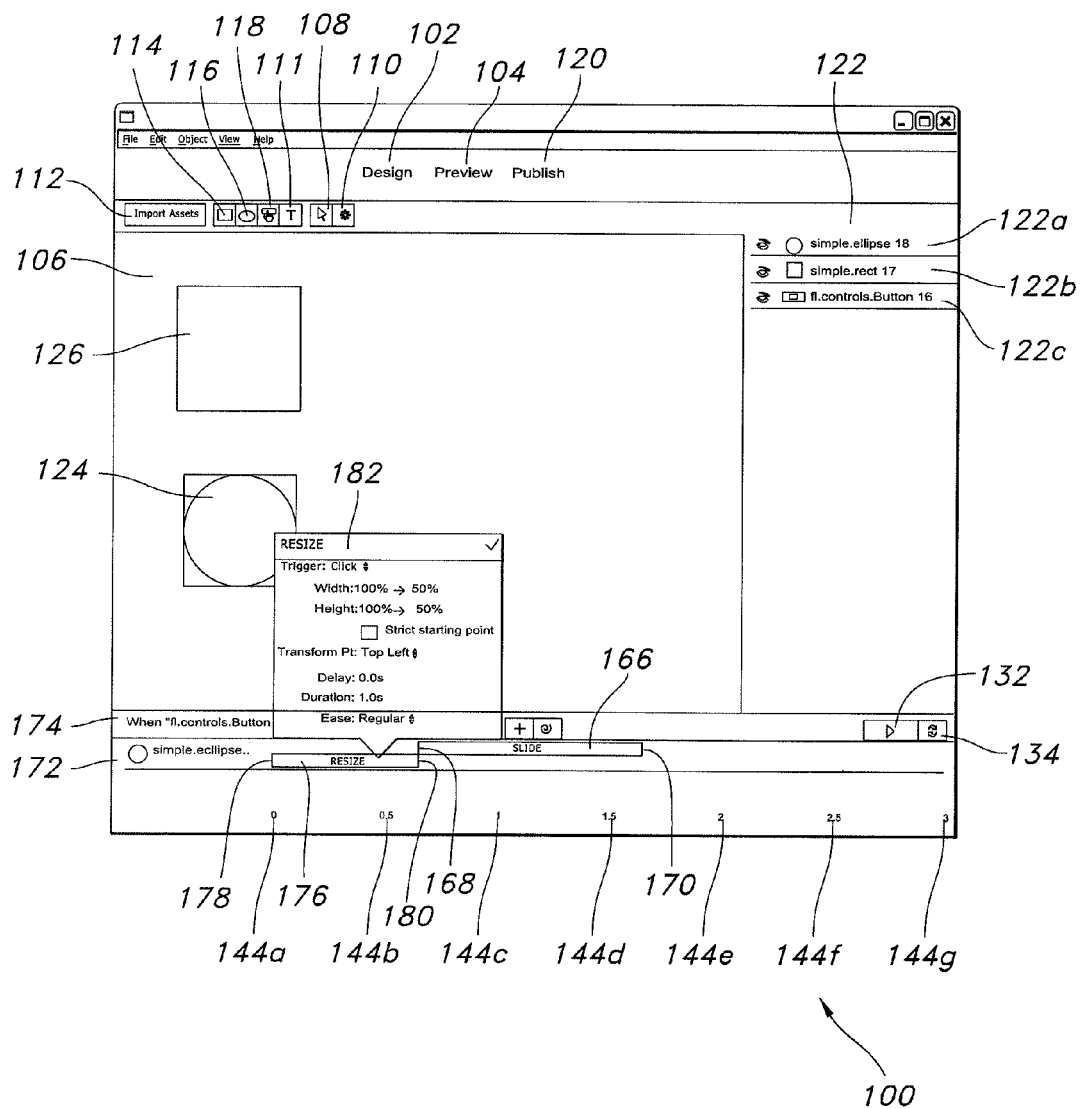

As shown in FIG. 2h, the user next adjusts the duration of the resize action using the timeline interface 174. The user clicks on the end 180 of the representation 176 of the resize action at its location in FIG. 2g (i.e., at the 1 second time increment) and drags the end 180 to its location in FIG. 2h (i.e., just after the 0.5 second increment) so that the end of the resize action corresponds to the beginning of the slide action, i.e., the resize action concludes 0.6 seconds after a button click event and the slide action begins at that time. Accordingly, the timeline interface 174 in this example has provided the user with a convenient mechanism for viewing and modifying the timing attributes of multiple actions associated with the button click event and the circle 124.

Figure 2I:
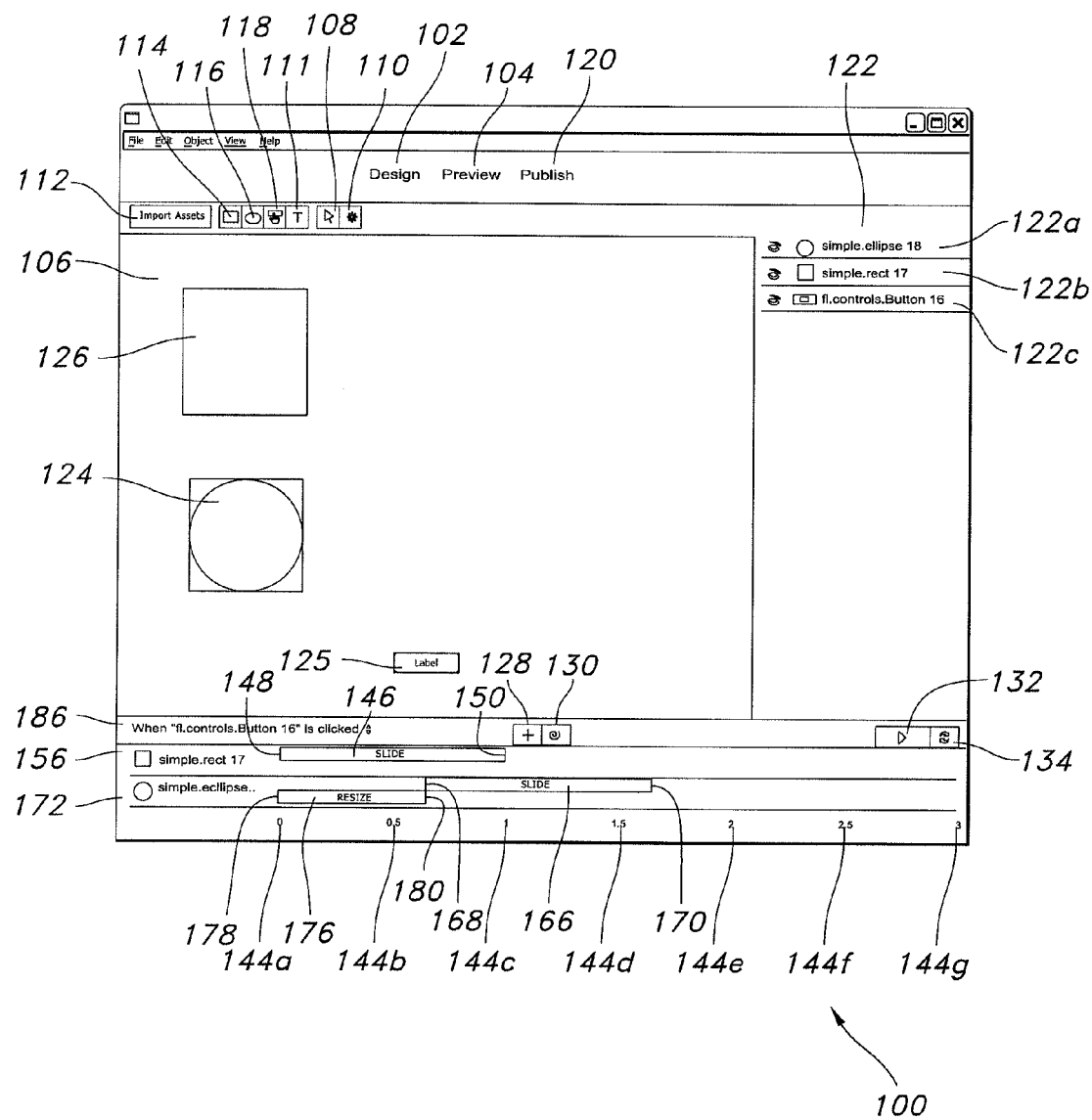

As shown in FIG. 2i, the user may next select the button 125 on the canvas 106 to observe a list 184 of all actions triggered by an event at the button 125. The user interface also presents an all objects timeline interface 186 showing all of the representations 146, 166, 176 of all actions triggered by the click event of the button 125. This allows a developer to envision how the timing of the various actions will relate to one another. For example, the user can see that the slide action of the rectangle 126 will overlap all of the circle's 124 resize action and the beginning of the circle's 124 slide action. As an application or content is being developed, the ability to easily see the relationship of such timing attributes can significantly improve a user's efficiency and effectiveness.

Illustrative Examples of Creating Interactivity

Certain embodiments of the present disclosure relate to specifying an action-trigger interactivity model, which defines how a user is able to add behavior to content. Generally, interactivity relies on the events a given object component can receive as well as global events not related to a particular object. For example, events may be messages from a sender object to a receiver object, for example a button sends a message of "I was clicked" to a video object, which understands from the message that it should start playing its video, etc. Object components thus will generally have actions they can execute and events they can recognize. Certain embodiments facilitate development of actions by providing a visual interface that displays components and "advertises" the events (i.e., trigger events) a given component can recognize and the actions it can execute. The source of an event can be from the user (mouse, keyboard, touch-screen, voice, etc.), internally generated (the same component or other components in the document) and externally (timer, network activity). For example, mouse events include down, up, click, double click, mouse enter, mouse exit, etc.

There is a wide breath of actions a given component may be able to perform. Like objects, actions may be installed with the development program or may be available from imported sources. For example, an action application programming interface (API) may be made available for third parties to define objects and actions. Thus, the development application may be extensible and allow plug-in object and action components. In addition, the attributes of an object or action may be changed. An action may dictate how it is layered and sequenced with other actions.

Actions include, but are not limited to, transforms, effects, and behaviors. For example, a transform action is one that modifies component parameters, such as position, rotation, alpha, scale, skew, repel from, and attract to. An effect action is one that utilize a runtime player's filters and/or does some type of processing of or on the content, for example, drop shadow, blur, glow, bitmap manipulation, etc. By their nature effects can be layered. Behavior action perform some operation but do not modify transform or effect parameters. Examples are goto URL, goto page, send an event to another object to cause it to play, pause, set a property etc. Compound actions are those that fit into more than one of the other categories.

Actions can also be grouped depending on whether they are universal, component specific or freestanding. Universal actions can be applied to all components and are automatically made available for selection, e.g., set a property, goto URL, goto state, generate an event, goto page #, next, prev, etc. Component specific actions are also automatically made available for selection and are based on the component's type, e.g., video components can be played. These actions can be thought of as inherent/built into the component. Freestanding actions are not defined by the component, but instead are applied to a component, e.g., a bounce motion preset. Additional exemplary actions include but are not limited to: for a document—document specific actions, play, move, generate progress event, etc; for a page—page specific actions, transition, etc., for other objects—object specific actions, play, move, generate progress events, filter, effects (blur, shadow, emboss, glow, etc.), tweens; for a bitmap—bitmap specific actions; for a vector—vector specific actions; for audio/video—audio/video specific actions, start playback at time, generate progress events, pause, stop, rewind, fast forward, start playback at cue point, goto next/prev cue point, video specific actions, audio specific actions (mute, change volume). Actions for freestanding components include but are not limited to motion on object, mimic, motion of another component with modifiers, property with modifiers, with modifiers including, but not limited to, invert/do opposite, delay, cycle, repeat, repeat n times, repeat forever. Other actions for freestanding components include but are not limited to repeal from (mouse, other objects, edge of canvas/stage, etc. with attributes like hit radius and strength), attract to (mouse, other objects, edge of canvas/stage, etc.), attach noise to a property with attributes like frequency and amplitude, and change z-order incrementally (steps) or smooth (dissolve as you step.)

Exemplary user events include mouse events (down, up, click, double click, mouse enter, mouse exit, hover, start drag, end drag), keyboard, camera, and microphone events. Exemplary internal events include component loaded/created, component unloaded/deleted, action began/completed, sequence began/completed. Exemplary external events include timer, player, network activity, and file system activity. Exemplary event properties include delay, repeat N times, repeat forever, and collision detection events.

Figure 3A:
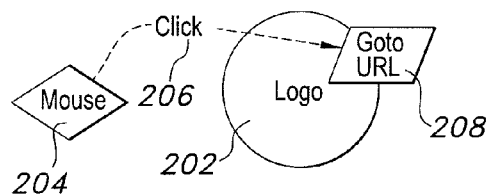
FIGS. 3a-f are illustrations of various types of interactivity that may be defined using a user interface according to certain embodiments.

FIG. 3a illustrates single component interactivity. In this example, a logo object 202 is used. The interactivity defines that when the mouse 204 is clicked (i.e., when the click event 206 occurs) on the logo a goto URL action 208 is triggered.

Figure 3B:
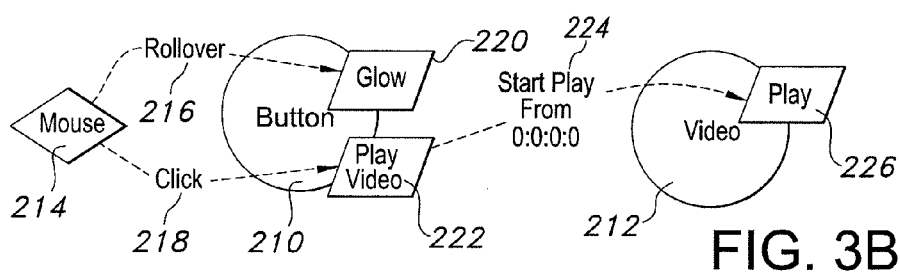

FIG. 3b illustrates component interactivity involving a button 210 and a video 212. Here, the interactivity is specified such that when the mouse 214 is rolled over 216 button 210 the button 210 performs a glow action 220. When the mouse 214 clicks 218 on the button 210 a play video action 222 is initiated that causes a start play event 224 at video 212, which performs a play 226 action in response.

Multi-component interactivity can be thought of as a relationship (or link) between two or more objects, that can be established, terminated, and/or interrogated. Each action may generate action-began and action-ended events or other events. For example, an action's end event can be used to sequence operations within and/or across components.

Figure 3C:
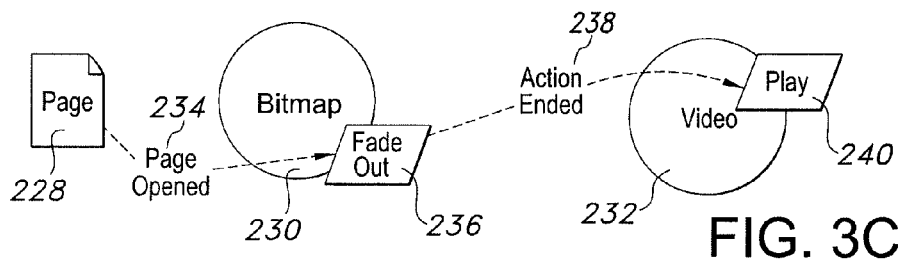

FIG. 3c illustrates component interactivity involving a page 228, a bitmap 230, and a video 232. The interactivity is specified such that when the page 228 is opened 234, the bitmap 230 performs a fades out action 236. At the conclusion of the fade out 236, an action ended event 238 triggers the video 232 to perform a play action 240.

Figure 3D:
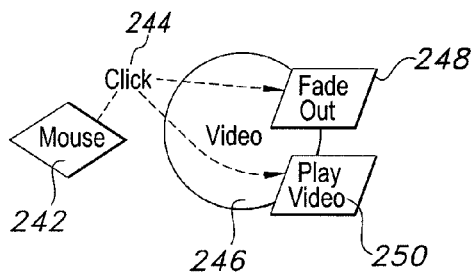
Figure 3E:
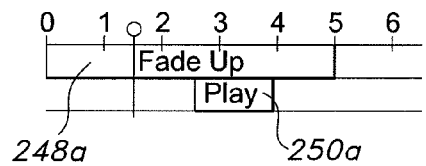

Multiple actions can be trigged from the same event. FIG. 3d illustrates component interactivity involving a mouse 242 and a video object 246. The interactivity is specified such that when the mouse 242 is clicked 244, the video 246 performs both a fade up 248 action and a play video 250 action. Additionally, the execution of the action can be delayed from the start of the event. Therefore each event causes actions to be executed/played. A per event timeline can show how actions are sequenced. FIG. 3e illustrates a timeline for the fade up 248, 248a and the play 250, 205a actions. Certain embodiments provide a user interface that displays such a time line to a user and allows the user to visually adjust the delay and duration parameters of actions.

Figure 3F:
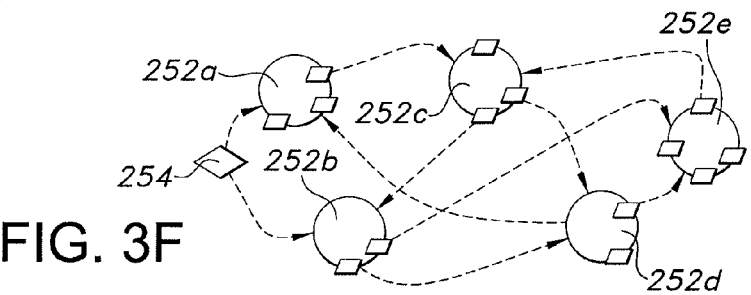

In certain embodiments, during the authoring process, a user may attach actions to the object and assign the events which trigger them to construct a web of interactivity in which multiple objects interact back and forth with one another and in loops, i.e., a first object performs an action resulting in an event that triggers a second object to perform an action resulting in an event that triggers a third object to perform an action resulting in an event that triggers the first object to perform an action, etc. Such a web of interactivity can grow in complexity, for example, even with a single initial triggering event 254, such an event can result in multiple actions performed by a set of multiple objects 252a-e, as illustrated in FIG. 3f. Certain embodiments also provide for infinite event loop checking to alert users of these and other potentially problematic interactivity relationships.

The user interface may or may not prevent a user from directly interacting with the objects programmatically, for example using declarative or procedural programming directly in the tool. To assist developers unfamiliar with the programming syntax and parameters or unable to program, the development tool may facilitate the development of interactivity by advertising as many events as possible for a given object type. Thus, even a relatively unsophisticated user may have easy access to a rich set of actions and events available to construct interactivity on an easy-to-use user interface. On the other hand, in some cases the available actions, events, objects, and other components may be limited to simplify the user interface in an effort to avoid overwhelming a user.

Figure 4:
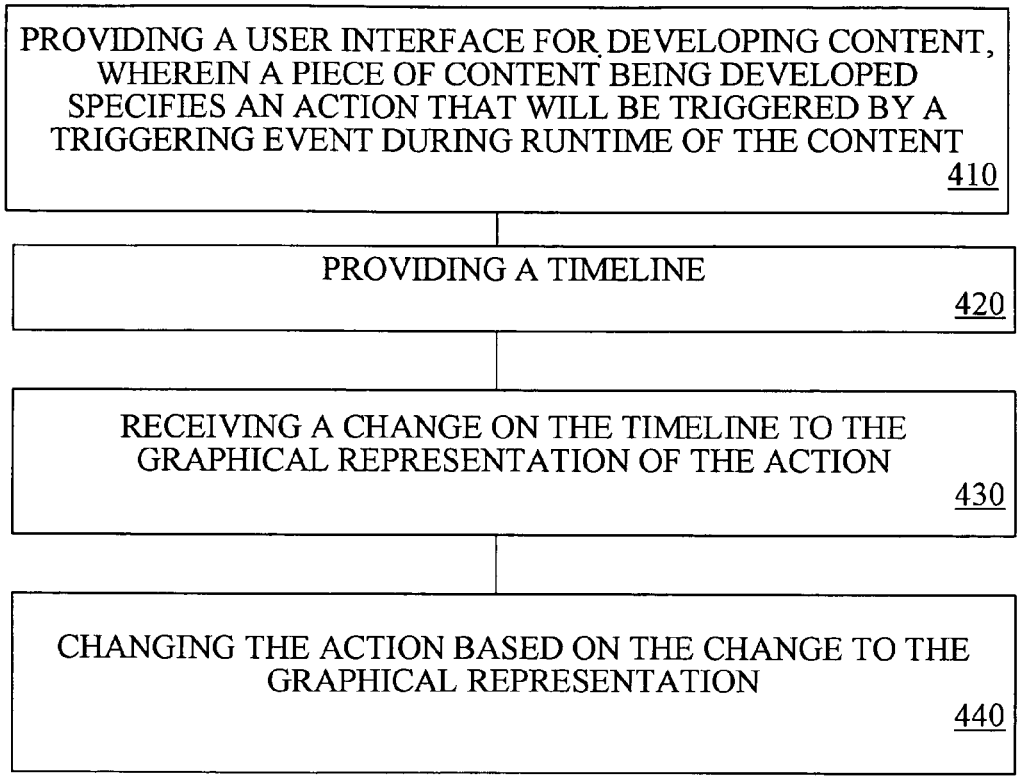
FIG. 4 illustrates an exemplary method of creating an action using a development application, according to certain embodiments.

Illustrative Method of Providing a Timeline Interface to Display and Edit Actions FIG. 4 illustrates an exemplary method of creating an action using a development application, according to certain embodiments.

As shown in FIG. 4, an exemplary method involves providing a user interface for developing content, wherein a piece of content being developed specifies an action that will be triggered by a triggering event during runtime of the content, as shown in block 410. The action may have a delay, duration, and other attributes associated with it. A delay time associated with the action defines an amount of time from the triggering event to a start of the action. A duration comprises an amount of time from the start of the action to an end of the action. The user interface may comprise an editing interface 22, as shown in FIG. 1, and thus comprise an editing canvas 28 and various tools 30 for editing objects and actions being developed for the content. An exemplary user interface is also shown in FIGS. 2a-i.

In certain embodiments, a displayed object is associated with the triggering event. For example, if the triggering object is a button, the triggering event may be a click of the button, and the action may be a movement of a shape on the canvas. However, a triggering event need not be associated with an object. For example, a triggering event may be the opening/execution of the content, e.g., triggering one or more actions to occur based on the opening of the content within a media content player.

Figure 5:
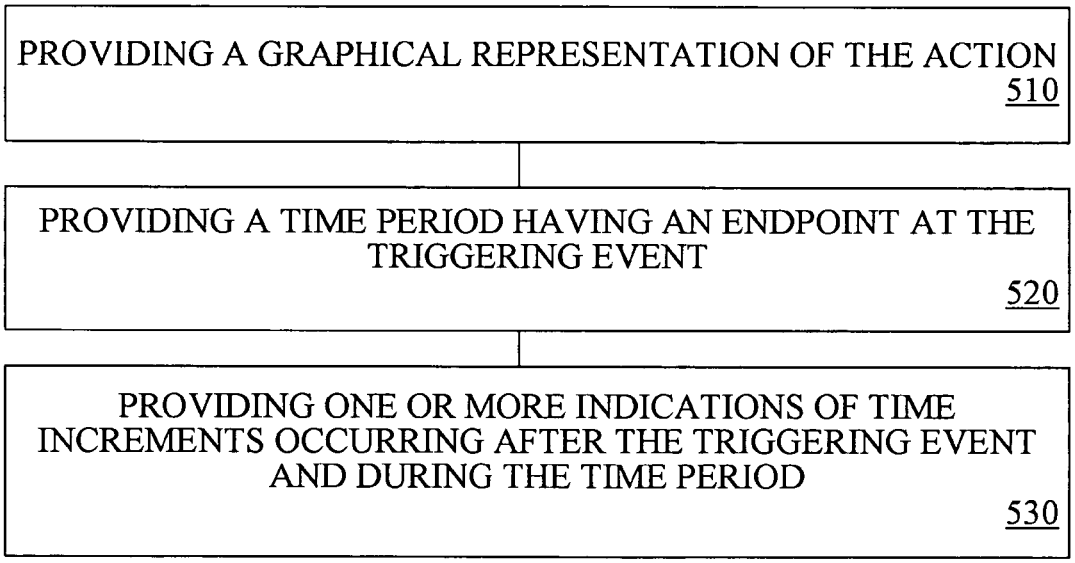
FIG. 5 illustrates an exemplary method of providing various features of a timeline, according to certain embodiments.

The method shown in FIG. 4 further comprises providing a timeline for display on the user interface, as shown in block 420. As illustrated in FIG. 5, providing the timeline may comprise providing a graphical representation of the action, as shown in block 510. The action may be displayed as a single object in the timeline meaning that the graphical representation may represent the entire action by illustrating the duration of the action relative to the timeline, both the start and end of the action as part of the same object displayed on the timeline, or by a single representation displaying one or more aspects of the action occurring over a portion of the time represented by the timeline. In some cases, the graphical representation of the action may comprise a feature representing the start of the action, a feature representing the end of the action, a feature representing the duration of the action, and feature representing delay of the action. The timeline may also provide the graphical representation of the action with respect to a particular time period having an endpoint at the triggering event, as shown in block 520, and one or more indications of time increments occurring after the triggering event and during the particular time period, as shown in block 530. In certain embodiments, the timeline can be modified by a user to adjust the time period and/or displayed time increments.

In addition, in certain embodiments actions and events can be associated with scalar time increments of the timeline independent of any frame of the content. In such a timeline, any increment of time is possible, not just within a certain frame. Scalar increments may allow for more specificity than mere frame targeting of events. Moreover, associating whole actions with scalar time increments on such a timeline may simplify development of interactivity and interactive content relative to developing similar features using traditional frame-based timeline tools.

Returning to FIG. 4, the method shown further comprises receiving a change on the timeline to the graphical representation of the action, as shown in block 430. As examples, the change may change the start or end of the action, the delay of the action, or the duration of the action, among other things.

The method shown in FIG. 4 further comprises changing the action based on the change to the graphical representation of the action, as shown in block 440. For example, any information about the action attributes, e.g., a display of a numerical delay value, etc., may be changed to reflect the change to the graphical representation of the action.

Certain embodiments provide an event-based timeline, e.g., a timeline showing and allowing changes to all actions associated with a particular triggering event. Such a timeline may comprise indications of the time increments from the occurrence of the triggering event and a graphical representation of each of a plurality of actions triggered by a same event. A timeline-based preview component may provide a quick and easy mechanism for a user to preview only those actions shown in a displayed timeline, which in some embodiments, include actions associated with a single object, actions associated with a single action, among other useful groupings of actions that may be displayed on a timeline. Such a preview component may be a part, for example, of a general preview engine as illustrated in FIG. 1 allowing a user to preview an executing or compiled or otherwise finalized version of a piece of content that is being developed without leaving the development environment. The combination of timeline and preview features may significantly improve efficiency in the development of interactive content, especially content involving complicated interactions between displayed objects.

General

Certain embodiments relate to a user interface that provides specific functionality, such as the ability to visually define interactivity. These are merely illustrative. In short, the techniques for supporting the development of media and the other features described herein have uses in a variety of contexts, not to be limited by the specific illustrations provided herein. It should also be noted that embodiments may comprise systems having different architecture and information flows than those shown in the Figures. The systems shown are merely illustrative and are not intended to indicate that any system component, feature, or information flow is essential or necessary to any embodiment or limiting the scope of the present disclosure. The foregoing description of the embodiments has been presented only for the purpose of illustration and description and is not intended to be exhaustive or to limit the disclosure to the precise forms disclosed. Numerous modifications and adaptations are apparent to those skilled in the art without departing from the spirit and scope of the disclosure.

As is known to one of skill in the art, an application may be resident in any suitable computer-readable medium and execute on any suitable processor. For example, in FIG. 1, the device 10 shown may comprise a computer-readable medium such as a random access memory (RAM) 14 coupled to a processor 12 that executes computer-executable program instructions stored in memory 14. Such processor(s) may comprise a microprocessor, an ASIC, a state machine, or other processor, and can be any of a number of computer processors. Such processors comprise, or may be in communication with a computer-readable medium which stores instructions that, when executed by the processor, cause the processor to perform the steps described herein.

A computer-readable medium may comprise, but is not limited to, an electronic, optical, magnetic, or other storage or transmission device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. A computer-readable medium may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

While the development application is shown operating on a single device, alternative embodiments include applications that reside and/or access data stored on more than one device and/or that utilize a network to transmit information. Other alternative configurations are of course possible. The device 10 may also comprise a number of external or internal devices such as a mouse, a CD-ROM, DVD, a keyboard, a display, or other input or output devices. Examples of devices that could execute a development application are personal computers, digital assistants, personal digital assistants, cellular phones, mobile phones, smart phones, pagers, digital tablets, laptop computers, Internet appliances, other processor-based devices, and television viewing devices. In general, a device may be any type of processor-based platform that operates on any operating system capable of supporting one or more applications.

That which is claimed is:

1. A computer implemented method comprising:
providing a user interface for developing content, wherein a piece of content being developed specifies an action that will be triggered by a triggering event during runtime of the content, and wherein a delay time associated with the action defines an amount of time from the triggering event to a start of the action and a duration comprises an amount of time from the start of the action to an end of the action; and
providing a timeline for display on the user interface, the timeline comprising a graphical representation of the action as a single object, the timeline representing a time period having an endpoint at the triggering event and further comprising one or more indications of time increments occurring after the triggering event.

2. The method of claim 1, wherein the graphical representation of the action comprises a feature representing the start of the action, a feature representing the end of the action, a feature representing the duration of the action, and feature representing delay of the action.

3. The method of claim 1, wherein actions and events can be associated with scalar time increments of the timeline independent of any frame of the content.

4. The method of claim 1 further comprising receiving a change to the graphical representation of the action on the timeline and changing the action based on the change to the graphical representation of the action.

5. The method of claim 4, wherein the change changes the start of the action.

6. The method of claim 4, wherein the change changes the end of the action.

7. The method of claim 4, wherein the change changes the delay time of the action.

8. The method of claim 4, wherein the change changes the duration of the action.

9. The method of claim 1 further comprising receiving a selection of an object to trigger the triggering event, the object displayed on a canvas displayed on the user interface.

10. The method of claim 9, wherein the object is a button, the triggering event is a click of the button, and the action is a movement of a shape on the canvas.

11. The method of claim 1, wherein the opening of the content is the triggering event.

12. The method of claim 1 further comprising receiving a selection of an object to perform the action, the object displayed on a canvas displayed on the user interface.

13. A computer implemented method comprising:
providing a user interface for developing content, wherein a piece of content being developed specifies a plurality of actions that will be triggered by a triggering event during runtime of the content, and wherein each action of the plurality of actions is associated with a delay time and a duration, the delay time defining an amount of time from the triggering event to a start of the action and the duration defining an amount of time from the start of the action to an end of the action; and
providing a timeline for display on the user interface, the timeline comprising one or more indications of time increments from the occurrence of the triggering event, the timeline further comprising a graphical representation of each of the plurality of actions;
wherein the same event is the triggering event for each action of the plurality of actions.

14. The method of claim 13 further comprising receiving a change to one of the graphical representations on the timeline and changing one of the plurality of actions based on the change to the graphical representation.

15. The method of claim 13, wherein a single object performs the plurality of actions.

16. The method of claim 13, wherein the plurality of actions are performed by different objects.

17. The method of claim 13 further comprising providing a preview of the plurality of actions for the timeline, wherein the preview displays only the plurality of actions triggered by the event such that the preview excludes any actions triggered by other events.

18. A system comprising:
    a processor;
    a user interface component for developing content, wherein a piece of content being developed on the user interface component specifies an action that will be triggered by a triggering event during runtime of the content, and wherein a delay time associated with the action defines an amount of time from the triggering event to a start of the action and a duration comprises an amount of time from the start of the action to an end of the action; and
    a timeline component of the user interface, the timeline component displaying one or more indications of time increments from the occurrence of the triggering event, the timeline component further comprising a graphical representation of the action.

19. The system of claim 18, wherein the timeline component in interactive and receives a change to the graphical representation of the action and changes the action based on the change to the graphical representation of the action.

20. The system of claim 19, wherein the change is an edit of the delay or the duration.

21. The system of claim 18, wherein the timeline component displays multiple action representations, each action representation representing a different action triggered by the same event.

22. A computer-readable storage medium on which is encoded program code, the program code comprising:
    program code for providing a user interface for developing content, wherein a piece of content being developed specifies an action that will be triggered by a triggering event during runtime of the content, and wherein a delay time associated with the action defines an amount of time from the triggering event to a start of the action and a duration comprises an amount of time from the start of the action to an end of the action; and
    program code for providing a timeline for display on the user interface, the timeline further comprising a graphical representation of the action as a single object, the timeline representing a time period having an endpoint at the triggering event and comprising one or more indications of time increments occurring after the triggering event.

\* \* \* \* \*